United States Patent [19]

Andoh et al.

[11] 4,149,782

[45] Apr. 17, 1979

[54] CINEMATOGRAPH

[75] Inventors: Akira Andoh; Hideo Nakaoka, both of Tokyo; Yoshimi Ono, Kawasaki, all of Japan

[73] Assignee: Ricoh Company, Ltd., Japan

[21] Appl. No.: 826,869

[22] Filed: Aug. 22, 1977

[51] Int. Cl.$^2$ ............................................. G03B 41/04
[52] U.S. Cl. .................................. 352/115; 352/162; 352/163
[58] Field of Search ............... 352/113, 114, 115, 162, 352/163, 119

[56] References Cited

U.S. PATENT DOCUMENTS

| 1,780,123 | 10/1930 | Florine | 352/115 |
| 1,796,140 | 3/1931 | Continsouza et al. | 352/115 |
| 1,913,488 | 6/1933 | John | 352/114 |
| 2,120,249 | 6/1938 | Holman | 352/115 |
| 2,410,069 | 10/1946 | Holman | 352/115 |
| 2,587,183 | 2/1952 | Manderfeld | 352/163 |
| 3,447,866 | 6/1969 | Heisler | 352/119 |

FOREIGN PATENT DOCUMENTS 388933  6/1908  France ..................................... 352/114

*Primary Examiner*—Monroe H. Hayes
*Attorney, Agent, or Firm*—McGlew and Tuttle

[57] ABSTRACT

A cinematograph comprises a plurality of lenticules, a projection lens for capturing and passing optical flux from one of the lenticules, a light source for illuminating the image surface of a cine-film which is disposed in a plane which includes the focus of the lenticule and feed means for synchronously feeding the film and the lenticules.

9 Claims, 21 Drawing Figures

CINEMATOGRAPH

BACKGROUND OF THE INVENTION

1. Field of the Invention

This invention relates in general to a cinematograph or motion picture projector in which a cine-film is continuously fed, and in particular to a new and useful cinematograph which utilizes a plurality of lenticules that are moved in synchronization with frames of a cine-film.

2. Description of the Prior Art

A film transport in a cinematograph generally comprises a claw escapement of the intermittent feed type in which a claw is engageable with perforations formed along one edge of the film and is reciprocally driven in synchronism with the rotation of shutter blades. This construction requires the intermittent movement of a lever having substantial length which engages with or disengages from the perforations in the film. This, in turn, results in the generation of noises and an increased complexity of the arrangemnt even though the involved mechanism may be improved. The problem of noises represents a degraded quality in projectors of this type, particularly when compared with tape recorders or television receivers. When the cinematograph of the intermittent feed type is employed in a conversion of cine-film into a television signal as in a telecine unit, the differential number of frames per second between a cine-film and a television signal, which may be 24 and 30 frames per second for the film and television signal respectively, has required flashing the light source of the projector at a rate determined by the number of frames of the television signal or varying the escapement rate of the film to achieve the frame rate of the television signal. The required irregular change of the escapement cycle for the film or of the illumination rate of the light source involves a difficulty in the timing control and results in a complex mechanical and electrical arrangement which increases the manufacturing cost of such units.

It is known to overcome the noise problem in cinematographs by using either polyhedron prisms or mirrors which are rotated for purposes of image tracking. A cinematograph of this kind utilizes a continuous feeding of film to reduce the noises to a degree, but requires an increased projection frequency and a separate provision of shutter blades to overcome a flickering during the film projection. The presence of the shutter blades however, further frustrates the minimization of noises. Since the cinematograph again utilizes an intermittent projection of individual film frames, the same problems as to the mechanism and the illumination as in the intermittent transport system remains. In addition, the prism or mirror used, must be of a high precision, resulting in a cost and a complexity which are comparable to or greater than those of the escapement approach.

SUMMARY OF THE INVENTION

It is an object of the invention to provide a cinematograph with reduced operating noises.

It is another object of the invention to provide a cinematograph which is simple in construction rugged in design and inexpensive to manufacture.

It is a further object of the invention to provide a cinematograph which can be used directly as a telecine unit without requiring special consideration for the mechanism.

It is still another object of the invention to provide a cinematograph which is free from flickering.

It is a still further object of the invention to provide a cinematograph capable of producing a clear projection of a projection frame.

It is another object of the invention to provide a cinematograph which eliminates a movement of a projected image.

In accordance with the invention, a plurality of lenticules and a cine-film, which is disposed at the focal plane of the lenticules are located in planes which are parallel to each other and are continuously fed in a synchronous manner. A projection lens captures and passes an optical flux from a particular lenticule, thus continuously focussing an image from the film, onto a screen. A film gate is provided between the film and the lenticules which has an aperture of a size exceeding that of the image which impinges on the projection lens. Alternatively, a limiting framework may be provided between the lenticule and the projection lens for limiting or restricting the flux from the lenticule. An intermediate lens may be interposed between the cine-film and the projection lens to focus a film image once at a position therebetween, where a projection frame may be located. In addition, means may be provided which causes the lenticule to move along a rectilinear locus as it traverses the optical axis of the projector.

With the cinematograph of the invention, the cine-film is continuously fed, and the use of a rotating shutter found in the prior art for preventing a flickering is avoided, thereby reducing the noise level. As compared with the intermittent transport approach, the film feed mechanism is simplified in the arrangement of the invention, allowing a reduction in the cost. Because film images are continuously projected on the screen, there is no need for the provision of special mechanisms when the cinematograph is to be used as a telecine unit. A flickering which occurs as a result of the projection of upper and lower edges of an aperture in the film gate can be eliminated by increasing the aperture size beyond the extent of the image frame as it impinges on the projection lens or by the provision of the limiting framework which restricts the flux from the lenticule. By using an intermediate lens which focuses the film image at an intermediate position where a projection frame is placed, a clear projection of the projection frame is enabled. Finally, means may be provided to direct the locus of movement of the lenticule in a rectilinear direction as it traverses the optical axis of the projector, thereby eliminating a movement of the projected image plane.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
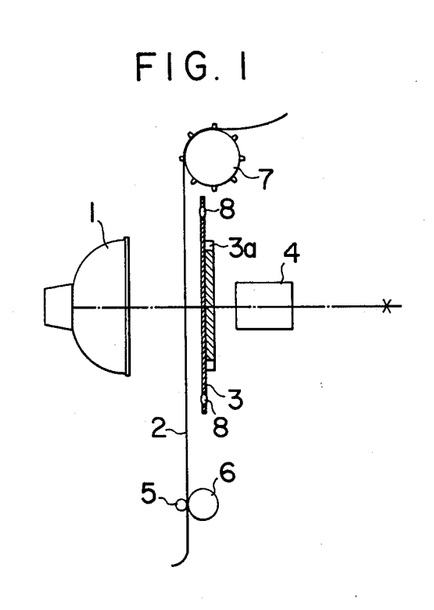
FIG. 1 is a side elevation, partly in section, of one embodiment of the invention.
Figure 2:
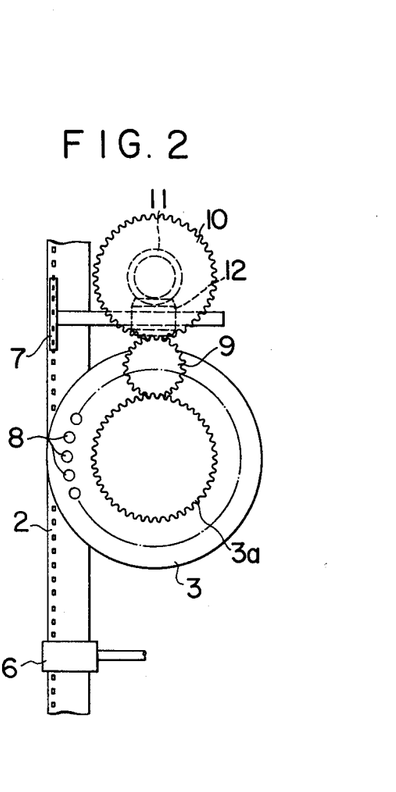
FIG. 2 is a front view of the embodiment of FIG. 1.
Figure 3:
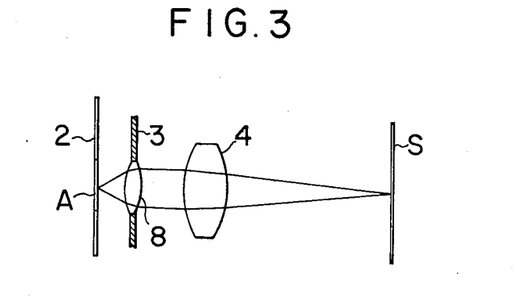
FIG. 3 is a schematic diagram of the optical system in accordance with the invention.

Referring to FIGS. 1 to 3, there is shown a first embodiment of the invention including a projection lamp 1, a cine-film 2, a lenticule holder disc 3 and a projection lens 4, disposed from left to right in the sequence named. As shown in FIGS. 2 and 3, the film 2 passes between a capstan 5 and a mating pinch roller 6, and is formed along its one lateral edge with perforations which are engaged by radially extending claws on a sprocket wheel 7 located above the capstan and the pinch roller. In this manner, the film 2 is maintained in a vertical plane between the sprocket wheel 7 and the capstan 5, and is continuously fed in the downward direction as the capstan 5 is driven by a motor (not shown). Adjacent its periphery, the disc 3 is formed with a series of openings in which lenticules 8 are fitted in a circular array. The spacing between adjacent openings or lenticules corresponds to the spacing of image frames on the film 2. The lenticules 8 are supported by suitable pivots so as to be rotatable within their respective associated openings in a plane parallel to the plane of the film surface, and the lenticules have their focus located on the film surface. On the side nearer the projection lens 4, the disc 3 is integrally formed with a concentric spur gear 3a having a radius less than that of the array of the lenticules 8. The spur gear 3a is engaged with a gear train comprising spur gears 9 and 10, a concentric worm wheel 11 integral with the gear 10, and a worm 12 which is integral and coaxial with the sprocket wheel 7. In this manner, the disc 3 is driven for rotation through the gear train as the film 2 is fed. The rate of rotation of the disc 3 is chosen such that the lenticules 8 move in synchronism with the movement of image frames on the film 2.

When the capstan 5 is driven by a drive source, not shown, the pinch roller 6 cooperates therewith to feed the film 2 continuously in the downward direction. As the film is fed, the sprocket wheel 7 rotates, and the rotation thereof is transmitted through the gear train comprising the worm 12, worm wheel 11 and spur gears 10, 9 and 3a to the disc 3, which thereby rotates counterclockwise as viewed in FIG. 2, moving the lenticules 8 thereon at an angular velocity in synchronism with the linear velocity of the film feeding operation. It will be noted that both the film 2 and the lenticules 8 move in planes which are parallel to each other. Since the lenticule 8 has its focus on the film surface, an image from the film 2 is converted by the lenticule 8 into a flux of parallel rays, which is then focussed by the projection lens 4 onto the screen. Since the projection lens 4 is capable of capturing and passing the flux from the lenticule 8, an image of frame A on the film 2 is projected through the corresponding lenticule 8 and projection lens 4 on a screen S (see FIG. 3) as a magnified image. As the lenticule 8 corresponding to the image A moves out of the included angle or covering power of the projection lens 4, the next following image and its corresponding lenticule enters the covering power of the lens 4 to be projected onto the screen S, whereby images are continuously projected on the screen S in succession. It is to be noted that the projection lamp 1 is designed to be able to illuminate an area corresponding to at least two image frames on the film 2 while the projection lens 4 has an image circle which is commensurate with at least two lenticule areas, namely, so as to be capable of capturing and passing flux from two consecutive lenticules 8, thus permitting more than one frame to be projected in an overlapped relationship.

During the operation of the inventive cinematograph, an oscillation of the lenticule holder disc 3 may be caused by a backlash of the gear 3a or the gear train, thus causing a movement of the projected image. This can be easily avoided by applying a reverse tensioning to the gear 3a.

A framing capability is an essential feature of a cinematograph. In the embodiment described above, this can be easily achieved by substituting helical gears for the spur gears 10, 9 and 3a and making one of them displaceable in the axial direction so that the lead of the helical gear enables a critical change in the relative position where they mesh with each other, thus permitting an adjustment of the relative position of the lenticule and the film.

A cinematograph of the type just mentioned in which the film is continuously fed avoids the occurrence of a flicker which results from the use of shutter blades, but suffers from another cause of flickering which is attributable to the use of a film gate also required in the embodiment described. The film gate has an aperture defined therein for determining an image field to be projected. Since the aperture is fixed in position, as the film and the lenticules move in synchronism, the image of the upper and lower edges of the aperture is projected onto the projected image and moves up and down therein, causing a flicker.

Figure 4:
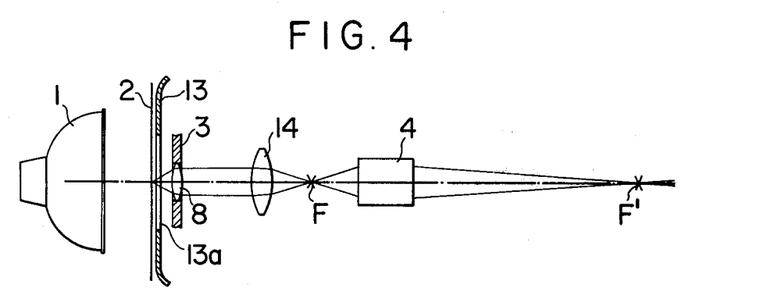
FIG. 4 is a schematic diagram of the optical system of another embodiment of the invention.
Figures 5, 6:
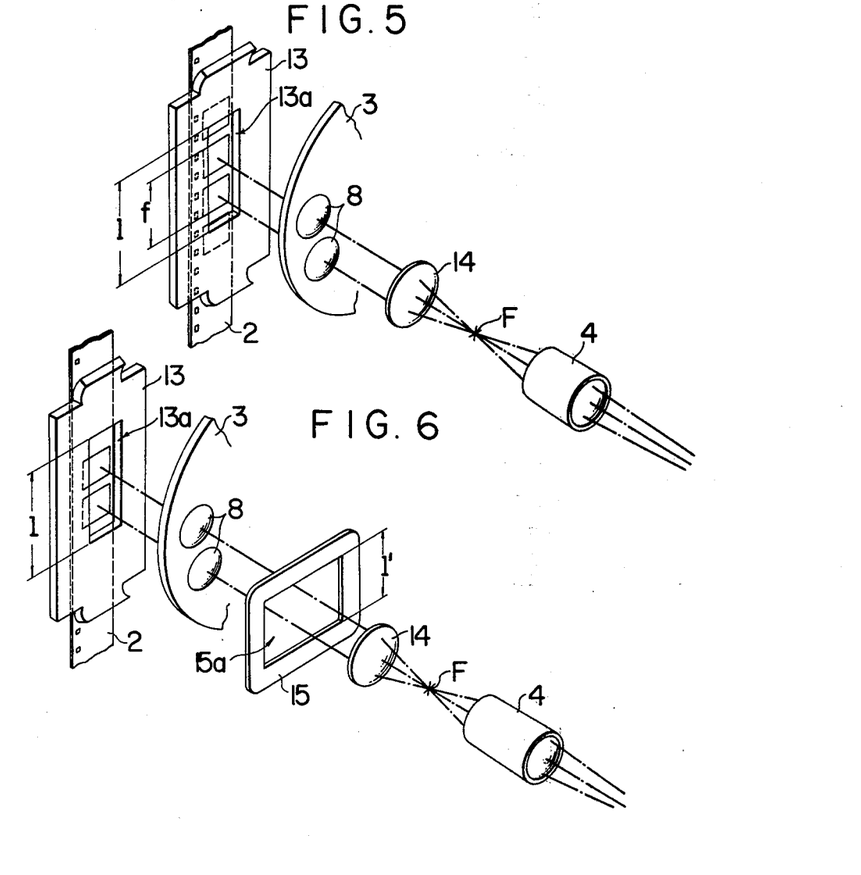
FIG. 5 is a perspective view of the embodiment shown in FIG. 4.
FIG. 6 is a perspective view of a further embodiment of the invention.

This flicker can be avoided in accordance with the invention by preventing the projection of the image of the aperture edges by the provision of additional means. Referring to FIG. 4 and FIG. 5, the surface of the film 2 which is located nearer the lenticule 8 is shown against a film gate 13 having an aperture 13a therein. An intermediate lens 14 is interposed between the lenticule 8 and the projection lens 4 for forming an image once at focus F. A spatial image once formed at the focus F is projected by the lens 4 onto the screen at point F'. Assuming that the intermediate lens 14 captures and passes the flux transmitting through two image frames of the film 2, the distance l between the upper and lower edges of the aperture 13a is chosen substantially greater than the combined length f of two image frames, as measured across their remote edges, of the film 2.

In this manner, it is possible for the intermediate lens 14 to pass only the flux corresponding to the two image frames, without passing rays coming from the aperture edges, thus preventing the projection of the image of the aperture edges and hence the flicker which might otherwise result therefrom. The requirement is that the aperture 13a of the film gate be chosen substantially greater than the image circle of the intermediate lens 14 or the extent of a frame or frames impinging thereon, and thus it can be made dependent on the latter size. It is to be understood, however, that the intermediate lens 14 is not essential in the invention, and the flux from the lenticule 8 may be directly passed through the projection lens 4. In the latter instance, the aperture 13a is sized depending on the number of frames which impinge on the projection lens 4.

FIG. 6 shows another embodiment of the invention which is characterized by the provision of a restriction framework 15 disposed intermediate the lenticule 8 and the intermediate lens 14 and having a window opening 15a which measures a distance l' across the upper and lower edges thereof. In this embodiment, assuming that the intermediate lens 14 is capable of capturing and passing the flux which is transmitted through two image frames of the film 2, the aperture 13a in the film gate 13 has a spacing l between its upper and lower edges which need not be substantially greater than the combined length of the two film frames, but which is substantially greater than the distance l' between the upper and lower edges of the window opening 15a in the restriction framework 15. With this arrangement, if the intermediate lens 14 is capable of passing rays coming from the aperture edges, such rays will be blocked by the restriction framework 15, effectively preventing their projection and a resulting flicker. Again, the intermediate lens 14 may be omitted, directly feeding the flux from the lenticule 8 to the projection lens 4.

Figure 7:
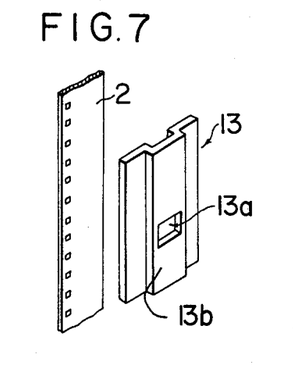
FIG. 7 is a perspective view of one form of aperture member used in a conventional projector.
Figure 8:
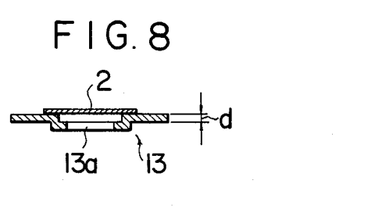
FIG. 8 is a cross section of the aperture member of FIG. 7.

As is well known, a projection frame is used in a cinematograph to clearly define a projected image field or area. In the conventional cinematographs, the projection frame is constituted by the aperture of the film gate or is separately inserted between the film gate and the projection lens. In either instance, the projection frame is unfocussing when projected, even though the film image is sharply projected on the screen. The reason therefor will be described below with reference to FIGS. 7 and 8, which illustrate an aperture 13a in a film gate 13 which is used as the projection frame. The film gate 13 bears against the film 2 only along the opposite lateral edges thereof, and is embossed with a rib 13b which projects outwardly on the opposite sides of a longitudinal centerline of the film 2 so as to straddle the image field. The aperture 13a which also serves as the projection frame is defined in the rib 13b. As a consequence, there is a spacing d, illustrated in FIG. 8, between the image plane of the film 2 and the projection frame 13a, which explains for the unfocussing of the image of the projection frame 13a when the optical system is adjusted to focus the image plane of the film onto the screen. The same applies when a separate projection frame is interposed between the film gate and the projection lens.

Figure 9:
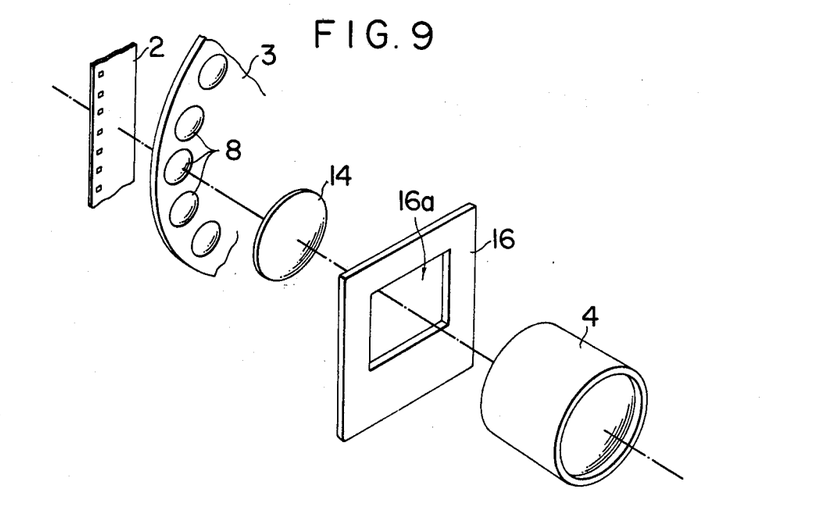
FIG. 9 is a perspective view of still another embodiment of the invention.
Figure 10:
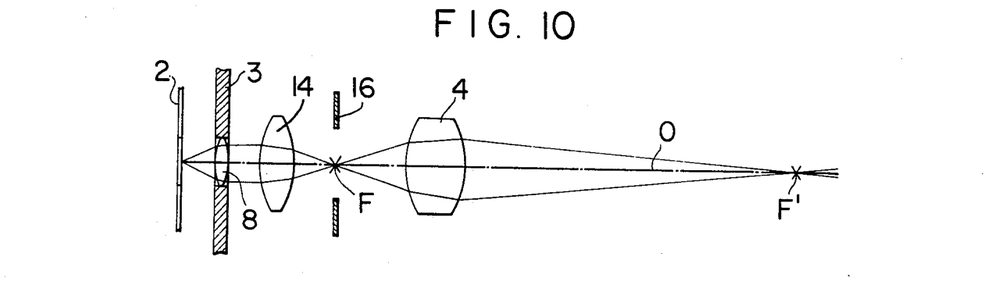
FIG. 10 is a schematic diagram of the optical system of the embodiment shown in FIG. 9.

The described disadvantage can be avoided by an embodiment shown in FIGS. 9 and 10. Referring to these Figures, film 2, lenticule holder disc 3, intermediate lens 14, projection frame 16 and projection lens 4 are disposed from left to right in the sequence named. The intermediate lens 14 is positioned to capture and pass the flux which is transmitted through a lenticule 8. As shown in FIG. 9, the projection frame 16 has a window opening 16a which is of a similar configuration as that of an image frame on the film 2, and which traverses the optical axis O at the focus F of the intermediate lens 14 in a direction perpendicular thereto. It is assumed that the film 2 and the lenticules 8 are fed synchronously by similar feed means as illustrated in FIGS. 1 and 2. It is also assumed that the plane in which the film 2 moves is parallel to that in which the lenticules 8 move, with the focus of the lenticule 8 located on the image surface of the film 2.

In the arrangement described above, light illuminating the film 2 is converted into a flux of parallel rays by the lenticule 8. The intermediate lens 14 captures and passes the flux to form a real image at the focus F thereof. The real image is projected by the projection lens 4 onto a screen located at the location of the focus F' thereof. Simultaneously, the image of the projection frame 16 located at the focus F of the intermediate lens 14 is projected by the lens 4 onto the screen, whereby the image on the film is framed by a sharp image of the projection frame 16.

Figure 11:
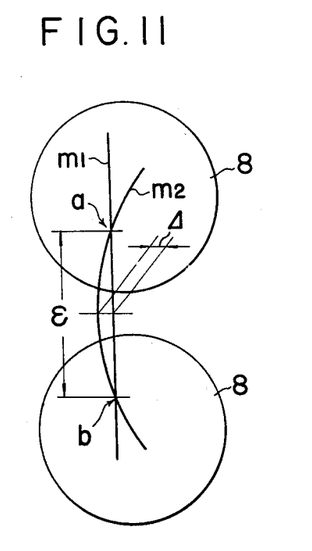
FIG. 11 is a schematic illustration of the locus of a lenticule.

In the embodiments described thus far, the lenticules are carried on a disc which is rotated to achieve a feeding of the lenticules. Referring to FIG. 11, it will be noted that the locus of movement $m_1$ of the film 2 is rectilinear while the locus of movement $m_2$ of the lenticule 8 is arcuate, producing a small deviation Δ between both the loci from the initiation of projection a to the termination of projection b. The deviation results in a variation in the position of the image projected onto the screen from time to time, causing a movement and hence a blurring of the image.

Figure 12:
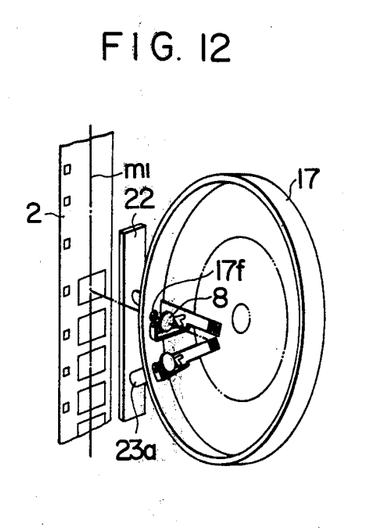
FIG. 12 is a perspective view of another form of lenticule feed means.
Figure 13:
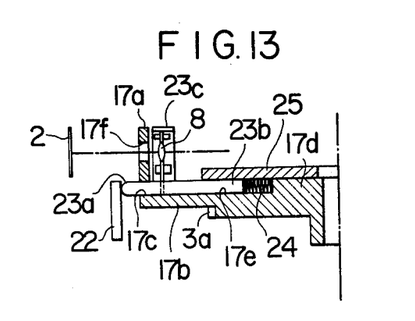
FIG. 13 is a cross section of the feed means of FIG. 12.
Figure 14:
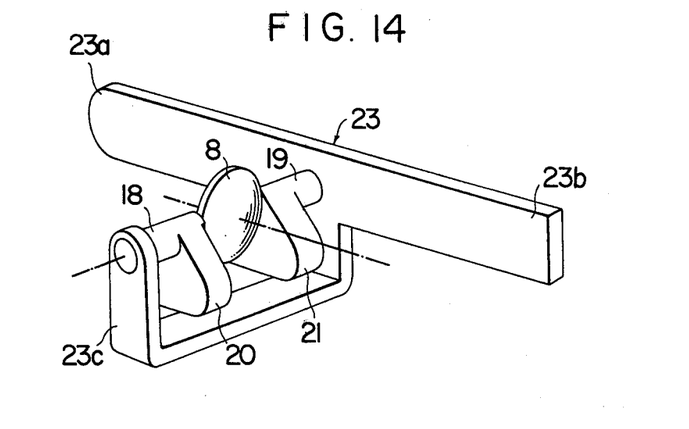
FIG. 14 is an enlarged perspective view of a lenticule holder used in the lenticule feed means of FIG. 12.

Such movement of the projected image can be prevented by using one of lenticule feed means shown in FIGS. 12 to 21. Referring to FIGS. 12 to 14 initially, an embodiment is shown in which the lenticule holder disc 3 shown in FIGS. 1 and 2 is replaced by a lenticule holder cylinder 17. A plurality of lenticules 8 are suspended on the cylinder 17 by a mechanism to be described later, and are urged radially outward from the cylinder periphery while being radially movable. A locus modifying cam 22 is disposed externally of the cylinder 17 at a position out of the path of ray emitted by the projection lamp and in a plane parallel to the film 2.

As shown in FIG. 14, a pair of arm members 18, 19 are secured to the opposite sides of a lenticule 8, with weights 20, 21 attached to the arm members. The assembly thus constructed may be formed as an integral molding of synthetic resin with a metal material inserted in the region of the weights, or as a framework having arm members secured thereto and on which a lenticule is mounted. The lenticule assembly is pivotally mounted on a lens holder 23, which comprises a rectangular plate having a front and a rear end 23a, 23b and a channel member 23c which is connected with the plate. The lenticule assembly is suspended so that the lenticule 8 assumes a vertical position as a result of the weights 20, 21. The cylinder 17 includes a cylindrical portion 17a and an end wall 17b, which is integrally formed with a spur gear 3a in the same manner as mentioned above in connection with FIGS. 1 and 2 for purpose of driving the cylinder in synchronism with the film 2. The cylindrical wall 17a is formed with a plurality of through-openings 17c into which the front end 23a of the lenticule holder or arm 23 is inserted. The rear end 23b of the holder 23 is fitted into an elongate groove 17e formed in a platform 17d which is formed centrally on the end wall 17b, with a coiled spring 24 urging the holder toward the cylindrical wall 17a. The groove 17e is closed by a retaining cover 25. In addition to the through-openings 17c, the cylindrical wall 17a is formed with a plurality of through-openings 17f which permit the passage of rays transmitting through the lenticule 8. The arrangement is such that the front end 23a of the holder 23 projects outwardly of the cylindrical wall 17a to abut against the cam 22 during the rotation of the cylinder 17, whereby the holder 23 is driven radially inward against the resilience of the spring 24.

Figure 15:
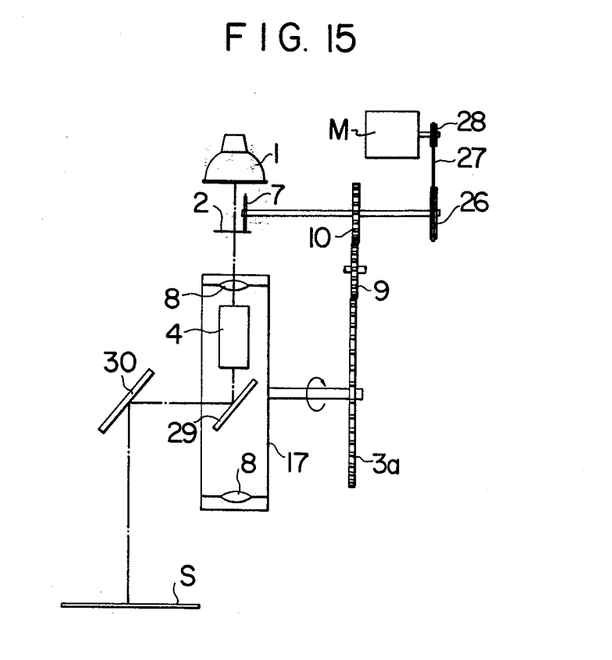
FIG. 15 is a schematic layout diagram of the optical system and the drive system incorporating the feed means of FIG. 12.

As shown in FIG. 15, the lenticule holder cylinder 17 is disposed in front of the film 2 which is fed by the sprocket wheel 7, and is driven for rotation by a drive unit which comprises spur gears 3a, 9, 10, pulley 26, belt 27 and a pulley 28 on a motor M. A ray passing through the lenticule 8 is focussed by the projection lens 4 and is led out of the cylinder by a pair of stationary mirrors 29, 30 to be projected onto the screen S.

With the above arrangement, it is assumed that each of the lenticules 8 assumes a parallel position to the film surface. The spacing between the film surface and the lenticule is maintained constant by the abutment of the holder 23 against the locus modifying cam 22 during a time interval when the lenticule traverses across the projection path, thus insuring that the lenticule and the film both move along rectilinear paths while maintaining their parallel relationship. In this manner, a movement and hence a blurring of the projected image is avoided, improving the quality of the projected image.

Figure 16:
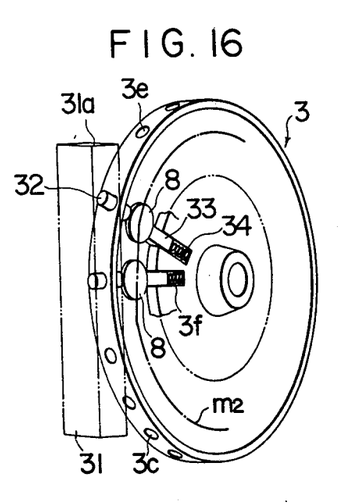
FIG. 16 is a perspective view of a further form of lenticule feed means.
Figure 17:
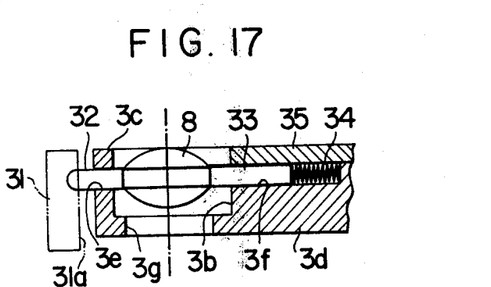
FIG. 17 is a cross section of the feed means shown in FIG. 16.

In another embodiment shown in FIGS. 16 and 17, lenticules 8 are supported on a holder disc 3 so as to be radially movable, and are urged in the outward direction by springs 34. A locus modifying cam 31 is disposed outside the disc 3. The disc 3 peripherally formed with a circular groove 3b, dividing it into an outer rim 3c and a central platform 3d, and a plurality of slots 3e and aligned elongate grooves 3f are formed in the rim 3c and the platform 3d on a plurality of radii which are circumferentially spaced apart by an amount corresponding to the spacing of image frames on the film 2. A pair of arm members 32, 33 secured to the opposite sides of a lenticule 8 are fitted into the slot 3e and the groove 3f, respectively, with a coiled spring 34 disposed in the groove 3f urging the arm member 33 radially outward. A retaining cover 35 is secured to the platform 3d to close the grooves 3f. In the region of each lenticule 8, the bottom of the groove 3b is formed with a slot 3g in alignment with the optical axis of the lenticule 8. The arms 32, 33 are integrally molded from a synthetic resin together with the lenticule 8. Alternatively, a lenticule may be fitted into a lens frame having a pair of oppositely extending arm members. The cam 31 is disposed for abutment against the arm member 32, and has an abutment surface 31a in a vertical plane which is parallel to the locus of movement $m_1$ of the film 2.

In operation, when the disc 3 is driven for rotation to bring one of the lenticules 8 into the path of rays conveying the film image, the arm member 32 abuts against the surface 31a of the cam 31 to be driven radially inward against the resilience of the spring 34, whereby the locus of movement $m_2$ of the lenticule 8 is aligned with the locus of movement $m_1$ of the film 2. When the disc 3 is further driven and the particular lenticule 8 is disengaged from the abutment surface 31a, it returns to its original position under the action of the spring 34 while the next following lenticule 8 moves into abutment against the cam 31, thus repeating the described procedure. As a consequence, the image on the film 2 is consistently projected onto the screen S at a fixed position, eliminating a movement of the projected image. In this embodiment, the arm members 32, 33 may be formed with a flat or profiled side or sides to prevent its rotation about its own axis so that the lenticule 8 is maintained in a plane which is normal to the ray.

Figure 18:
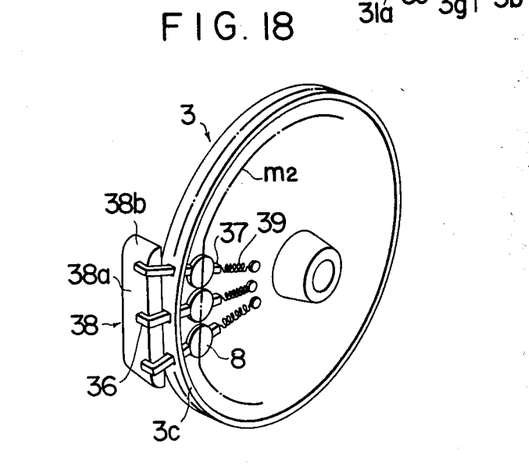
FIGS. 18 to 21 are perspective views of different forms of lenticule feed means.

FIG. 18 shows a further embodiment in which one of the arm members, 36, which is fitted into the slot 3e has an L-shaped end. A trapezoidal locus modifying cam 38 cooperates with the disc 3. The other arm member 37 is connected with a stationary point on the disc 3 through a coiled tension spring 39 which urges the arms 36, 37 toward the center of the disc 3. The cam 38 has curved edges 38b so that the folded end of the arm member 36 smoothly rides an abutment surface 38a of the cam 38 as it passes over the latter. This arrangement again prevents a movement and hence a blurring of a projected image by causing the arm members 36, 37 and the lenticule 8 to follow a path defined by the abutment surface 38a.

Figure 19:
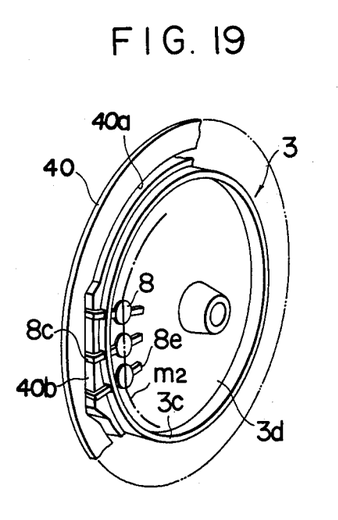

In FIG. 19, the disc 3 is surrounded by annular locus modifying cam 40 having a circular groove 40a formed therein. In the region of the path of ray from the film, the groove 40a is enlarged outwardly and is provided with a vertically extending surface 40b. The lenticule 8 is attached with a pair of arm members 8c and 8e. Arm 8e is movably connected to the central platform 3d of the disc 3 in a suitable manner. The other arm member 8c has an L-shaped end which is placed in the groove 40a. As it moves across the vertical surface 40b, it is pulled outward and moves along a path $m_2$ which is aligned with the locus of movement $m_1$ of the film.

Figure 20:
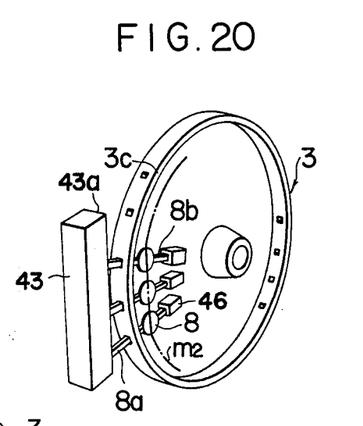

In FIG. 20, a locus modifying cam 43 having a vertical abutment surface 43a is located outside the disc 3. A lenticule 8 is associated with a pair of arm members 8b and 8a, one of which extends through a slot formed in the rim 3c and the other of which is supported by a carrier 46 so as to be movable in the radial direction. The lenticule 8 is driven outwardly by the centrifugal force while the cam 43 restricts its radial movement, thus bringing the locus $m_2$ of the lenticule 8 into alignment with the locus $m_1$ of the film 2.

Figure 21:
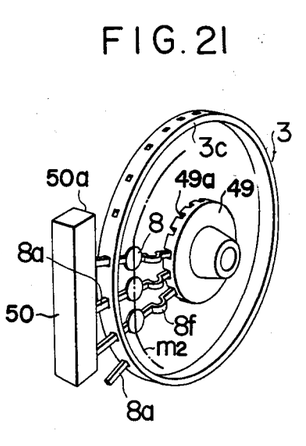

In FIG. 21, one arm member 8f secured to the lenticule 8 is molded from an elastomeric synthetic resin to form a loop therein. The free end of the arm member 8a is inserted into one of slots 49a formed in a hub 49 of the disc 3. A locus modifying cam 50 is located outside the disc 3 and has a surface 50a for abutment against the other arm member 8a which is formed to extend in a plane parallel to the locus of movement $m_1$ of the film 2. As the disc 3 rotates and a particular arm member 8a abuts against the cam 50, the lenticule 8 is driven radially inward, causing a distortion of the loop in the arm member 8f. In this manner, the locus $m_2$ of the lenticule 8 is aligned with the locus $m_1$ of the film 2. The member 8f restores to its original position, driving the lenticule 8 outward toward the rim 3c, as the arm member 8a is released from the cam 50.

In all of the arrangements shown in FIGS. 12 to 21, the cam is effective to modify the locus of movement of the lenticule into alignment with the locus of movement of the film, eliminating the deviation therebetween and hence a movement of the projected image. In this manner, the quality of the projected image is improved.

While specific embodiments of the invention have been shown and described in detail to illustrate the application of the principles of the invention, it will be understood that the invention may be embodied otherwise without departing from such principles.

What is claimed is:

1. A motion picture projector comprising a lamp for producing a light flux, a screen spaced from and facing said lamp, said light flux defining a light path between said lamp and said screen, a projection lens means disposed between said lamp and said screen in said light path for focusing said light flux onto said screen, a film having a succession of images thereon movable in a film path disposed between said lamp and said projection lens means and across said light path so that said images are focused upon said screen by said projection lens means, a lenticule holder disposed between said film and said projection lens means, a plurality of lenticules disposed at spaced locations on said lenticule holder, and feed means between said lenticule holder and said film for moving said holder and said film at respective speeds proportional to each other and for moving each of said lenticules in succession into a plane spaced from said film path by the focal distance of said lenticules and across said light path for allowing the continuous projection of said succession of images from said film onto said screen, said lenticule holder comprising a cylinder rotatable at a speed proportional to the motion of said film, said plurality of lenticules being disposed at equally spaced locations along the periphery of said cylinder, said cylinder includes a circular end plate having a plurality of radially extending slots therein, a plurality of lenticule arms slidably mounted in said radial slots, said lenticules being mounted in each of said lenticule arms for radial displacement, cam means disposed adjacent said cylinder and engageable with a portion of each of said lenticule arms for training the path of said lenticules into alignment with said film path in the vicinity of said light path, each of said lenticule arms including a pivotable arm member connected to each of said lenticules and having a weight connected thereto and extending downwardly therefrom for maintaining each of said lenticules in a plane parallel to the film in the vicinity of said light path.

2. A projector according to claim 1 further including a film gate disposed between said film and said lenticule holder, said film gate including an aperture of a size larger than the size of at least one of said images on said film.

3. A projector according to claim 1 including an intermediate lens disposed between said lenticule holder and said projector lens means in said light path for focusing said light flux as it comes from said lenticules into a real image in the area between said intermediate lens and said projector lens means.

4. A projector according to claim 1 further including a restricion framework disposed between said lenticule holder and said projector lens means having an aperture of a size sufficient to prevent the flickering of said succession of images projected on said screen.

5. A projector according to claim 1 wherein said feed means further comprises a plurality of perforations defined along said film, a rotatable shaft, a sprocket wheel affixed to said shaft for rotation thereby and engageable with said perforations to move said film, and a gear train connected between said rotatable shaft and said lenticule holder for rotating said lenticule holder at a speed proportional to the speed of movement of said film.

6. A cinematograph comprising a plurality of lenticules, feed means for feeding the lenticules in synchronism with a cine-film which lies in a plane including the focus of the lenticule, a projection lens for capturing and passing a flux of rays from at least one of the lenticules, a light source for illuminating the film, a plurality of lenticule holders each with an arm portion pivotable about a substantially horizontal axis for suspending the lenticules in a plane which is parallel to the film plane, means for holding the holders in a radially displaceable manner, and a locus modifying cam disposed outside said means for abutment by the lenticule holders to modify part of the locus of movement of the lenticules into a rectilinear form, said arm portions each including a weight extending downwardly therefrom for maintaining each lenticule in a substantially vertical plane.

7. A motion picture projector comprising a lamp for producing a light flux, a screen spaced from and facing said lamp, said light flux defining a light path between said lamp and said screen, a projection lens means disposed between said lamp and said screen in said light path for focusing said light flux onto said screen, a film having a succession of images thereon movable in a film path disposed between said lamp and said projection lens means and across said light path so that said images are focused upon said screen by said projection lens means, a lenticule holder disposed between said film and said projection lens means, a plurality of lenticules disposed at spaced locations on said lenticule holder, and feed means between said lenticule holder and said film for moving said holder and said film at respective speeds proportional to each other and for moving each of said lenticules in succession into a plane spaced from said film path by the focal distance of said lenticules and across said light path for allowing the continuous projection of said succession of images from said film onto said screen, said lenticule holder comprises a rotatable disc and said lenticules are mounted at radially aligned and circumferentially spaced locations on said rotatable disc, a plurality of aligned spaced perforations and said feed means comprises a rotatable sprocket wheel engageable with the perforations and a gear train connected between said rotatable sprocket wheel and said rotatable disc for rotating said rotatable disc at a speed proportional to movement of said film, mounting means connected between each of said lenticules and said disc for allowing a radial displacement of each of said lenticules on said disc, said film path being linear and adjacent a tangent to the radial position of said lenticules on said disc, and cam means associated with said mounting means adjacent said film for training each of said lenticules into a path aligned with said film path in the vicinity of said light path, each of said mounting means includes a lenticule arm having an outer arm portion engageable with said cam means and an inner arm portion engageable with said disc, and biasing means between said inner arm portion and said disc for biasing said lenticule arm holder radially inwardly, said outer arm portion terminating in an L-shaped portion and said cam means including an outer flat surface aligned with said film path on a side of said cam means away from said disc, and said L-shaped outer arm portion being engageable over said cam means for training said lenticules into said film path in the vicinity of said light path.

8. A projector according to claim 7 wherein said gear train includes an axially displaceable helical gear which is axially displaceable in order to change the position of said film in respect to that of said lenticule holder to effect a framing of said succession of images projected onto said screen.

9. A motion picture projector comprising a lamp for producing a light flux, a screen spaced from and facing said lamp, said light flux defining a light path between said lamp and said screen, a projection lens means disposed between said lamp and said screen in said light path for focusing said light flux onto said screen, a film having a succession of images thereon movable in a film path disposed between said lamp and said projection lens means and across said light path so that said images are focused upon said screen by said projection lens means, a lenticule holder disposed between said film and said projection lens means, a plurality of lenticules disposed at spaced locations on said lenticule holder, and feed means between said lenticule holder and said film for moving said holder and said film at respective speeds proportional to each other and for moving each of said lenticules in succession into a plane spaced from said film path by the focal distance of said lenticules and across said light path for allowing the continuous projection of said succession of images from said film onto said screen, said lenticule holder comprises a rotatable disc and said lenticules are mounted at radially aligned and circumferentially spaced locations on said rotatable disc, a plurality of aligned spaced perforations and said feed means comprises a rotatable sprocket wheel engageable with the perforations and a gear train connected between said rotatable sprocket wheel and said rotatable disc for rotating said rotatable disc at a speed proportional to movement of said film, mounting means connected between each of said lenticules and said disc for allowing a radial displacement of each of said lenticules on said disc, said film path being linear and adjacent a tangent to the radial position of said lenticules on said disc, and cam means associated with said mounting means adjacent said film for training each of said lenticules into a path aligned with said film path in the vicinity of said light path, said cam means comprising an annular ring disposed about said disc having a substantially annular slot therein with a linear cord slot portion adjacent said film, and each of said mounting means comprises a lenticule arm having an outer arm portion extending beyond the circumference of said disc and engageable in said slot of said annular ring.

* * * * *

UNITED STATES PATENT AND TRADEMARK OFFICE
CERTIFICATE OF CORRECTION

PATENT NO. : 4,149,782
DATED : April 17, 1979
INVENTOR(S) : Akira Andoh et al.

It is certified that error appears in the above-identified patent and that said Letters Patent are hereby corrected as shown below:

On the cover sheet insert Foreign Priority Data:

-- Japan     103314     August 30, 1976
Japan     140575     October 19, 1976
Japan     151803     November 12, 1976
Japan     35080     March 23, 1977
Japan     39106     March 30, 1977 --.

Signed and Sealed this

Seventh Day of August 1979

[SEAL]

Attest:

*Attesting Officer*

LUTRELLE F. PARKER
*Acting Commissioner of Patents and Trademarks*